United States Patent [19]

Forsberg

[11] E Patent Number: Re. 32,235

[45] Reissued Date of Patent: Aug. 26, 1986

[54] MAGNESIUM-CONTAINING COMPLEXES, METHOD FOR THEIR PREPARATION, AND COMPOSITIONS CONTAINING THE SAME

[75] Inventor: John H. Forsberg, Mentor-on-the-Lake, Ohio

[73] Assignee: The Lubrizol Corporation, Wickliffe, Ohio

[21] Appl. No.: 484,007

[22] Filed: Apr. 18, 1983

Related U.S. Patent Documents

Reissue of:

[64] Patent No.: 4,094,801
Issued: Jun. 13, 1978
Appl. No.: 760,315
Filed: Jan. 18, 1977

U.S. Applications:

[63] Continuation of Ser. No. 291,149, Aug. 7, 1981, abandoned, which is a continuation of Ser. No. 16,652, Mar. 1, 1979, abandoned, which is a continuation-in-part of Ser. No. 681,627, Apr. 29, 1976, abandoned.

[51] Int. Cl.[4] ..... C10M 1/44; C10M 1/48; C10M 1/40; C10M 1/24

[52] U.S. Cl. ..... 252/33; 252/18; 252/25; 252/32.5; 252/32.7 E; 252/33.4; 252/39; 252/389 R; 252/389 A; 252/389.22; 252/389.62; 44/51

[58] Field of Search ..... 44/51; 252/18, 25, 32.5, 252/33, 33.4

[56] References Cited

U.S. PATENT DOCUMENTS

| | | | |
|---|---|---|---|
| 2,616,904 | 11/1952 | Asseff et al. | 252/33 |
| 3,629,109 | 12/1941 | Gergel et al. | 252/33 |

FOREIGN PATENT DOCUMENTS

| | | | |
|---|---|---|---|
| 670620 | 4/1952 | United Kingdom | 252/33 |
| 687490 | 2/1953 | United Kingdom | 252/33 |
| 789820 | 1/1958 | United Kingdom | 252/33 |
| 797409 | 7/1958 | United Kingdom | 252/33 |
| 806595 | 12/1958 | United Kingdom | 252/33 |
| 997335 | 7/1965 | United Kingdom | 252/33 |
| 1005957 | 9/1965 | United Kingdom | 252/33 |
| 1052380 | 12/1966 | United Kingdom | 252/33 |
| 1054280 | 1/1967 | United Kingdom | 252/33 |

*Primary Examiner*—William R. Dixon, Jr.
*Assistant Examiner*—Cynthia A. Prezluck
*Attorney, Agent, or Firm*—Walter C. Danison, Jr.; Denis A. Polyn; Forrest L. Collins

[57] ABSTRACT

Magnesium-containing complexes are prepared by heating a mixture of magnesium hydroxide, magnesium oxide, hydrated magnesium oxide or a magnesium alkoxide; a carboxylic acid, a sulfonic acid,a pentavalent phosphorus acid, or an ester or salt of any of these; water; and an organic solubilizing agent (which may be liquid or solid at ambient temperature) for the acid or ester. The amount of magnesium is such as to provide a basic composition. The resulting complexes may be obtained in liquid (which may be thickened) or solid form, and are useful as additives for lubricants and fuels and as protective coating compositions for metal surfaces (such as automotive undercoats and frame coatings).

32 Claims, No Drawings

MAGNESIUM-CONTAINING COMPLEXES, METHOD FOR THEIR PREPARATION, AND COMPOSITIONS CONTAINING THE SAME

Matter enclosed in heavy brackets [ ] appears in the original patent but forms no part of this reissue specification; matter printed in italics indicates the additions made by reissue. [This application is a continuation-in-part of copending application Ser. No. 681,627, filed Apr. 29, 1976 and now abandoned.]

*This application is a continuation of application Ser. No. 06/291,149, filed Aug. 7, 1981, now abandoned, which is a continuation of Ser. No. 06/016,652, filed Mar. 1, 1979, and now abandoned, which is a reissue of Ser. No. 05/760,315, filed Jan. 18, 1977, now U.S. Pat. No. 4,094,801, which is a continuation-in-part of Ser. No. 05/681,627, filed Apr. 29, 1976, and now abandoned.*

INTRODUCTION AND SUMMARY OF THE INVENTION

This invention relates to new magnesium-containing compositions of matter and methods for their preparation. More particularly, it relates to non-carbonated magnesium-containing complexes which are prepared by heating, at a temperature above about 30° C., a mixture comprising:

(A) At least one of magnesium hydroxide, magnesium oxide, hydrated magnesium oxide or a magnesium alkoxide;

(B) At least one oleophilic organic reagent comprising a carboxylic acid, a sulfonic acid, a pentavalent phosphorus acid, or an ester or alkali metal or alkaline earth metal salt of any of these;

(C) Water; and (D) At least one organic solubilizing agent for component B;

the ratio of equivalents of magnesium to component B, calculated as the free carboxylic or sulfonic acid or as the phosphoric acid ester, being at least about 5:1, and the amount of water present being at least sufficient to hydrate a substantial proportion of component A calculated as magnesium oxide.

Several methods are known for the preparation of basic magnesium compounds for use in lubricants, greases and the like. For example, U.S. Pat. No. 3,865,737 describes the formation of a highly basic magnesium-containing liquid dispersion by mixing an oil-soluble dispersing agent, magnesium oxide, a volatile aliphatic hydrocarbon solvent, alcohol, [watr] *water* and ammonia or an ammonium compound, treating the mixture with carbon dioxide, adding a non-volatile diluent oil and removing volatiles. Similarly, U.S. Pat. No. 3,629,109 describes the carbonation of a mixture of an oil-soluble organic acid or salt thereof, magnesium oxide, a lower aliphatic alcohol, water and an organic liquid diluent. The products obtained by these methods may be characterized, for the most part, as basic, oleophilic magnesium carbonates since an essential step in their preparation is reaction with carbon dioxide.

In accordance with the present invention, it has been discovered that highly basic magnesium complexes may be prepared without reaction with carbon dioxide or similar acidic gases. The products obtained in accordance with the present invention, which may be characterized as complexes of magnesium oxide or hydroxide and a magnesium sulfonate, carboxylate or phosphate, and which are hereinafter sometimes referred to merely as "magnesium complexes", have a wide variety of uses, including additives for lubricants and fuel oils and corrosion-resistant coatings or constituents thereof.

A principal object of the present invention, therefore, is to provide new oleophilic magnesium-containing compositions and a method for their preparation.

A further object is to provide a method for producing magnesium complexes which does not necessitate reaction with carbon dioxide or a similar acidic gas.

A further object is to provide basic magnesium compositions which may be obtained either in free-flowing liquid form or in thickened or solid form.

Still another object is to provide magnesium-containing compositions useful as greases, as detergent additives for lubricants or as corrosion inhibitors, vanadium scavengers and smoke suppressants for fuels, and in the formulation of corrosion-resistant coatings for metals.

Other objects will in part be obvious and will in part appear hereinafter.

COMPONENT A

Component A used in the method of this invention is magnesium hydroxide, magnesium oxide, hydrated magnesium oxide, a magnesium alkoxide, or a mixture of these. Magnesium hydroxide and magnesium oxide are, of course, represented by the formulas $Mg(OH)_2$ and MgO, respectively. Magnesium oxide exists in an inactive "dead burned" and a hydratable "reactive" form and the latter is the one which is useful in this invention although mixtures of the "reactive" form with minor amounts of the "dead burned" form may also be used. "Hydrated magnesium oxide", for the purpose of this invention, is magnesium oxide which is associated with water in an amount less than that required for conversion to magnesium hydroxide; that is, the amount of water is less than one mole per mole of magnesium oxide. As so defined, "hydrated magnesium oxide" may actually be a mixture of various proportions of magnesium oxide and magnesium hydroxide and its exact chemical nature is not critical to this invention. Typically, the amount of water present in "hydrated magnesium oxide" is at least about 0.7 mole per mole of the oxide.

The magnesium alkoxides, especially the lower alkoxides (i.e., those in which the alkyl groups contain 7 carbon atoms or less), are equivalent to magnesium oxide and hydroxide for the purpose of this invention; they are hydrolyzed by water to magnesium hydroxide under the conditions described hereinafter.

The equivalent weight of component A is half its molecular weight, since magnesium is a divalent element.

COMPONENT B

Component B is at least one oleophilic reagent comprising any of several types of organic acidic compounds or salts or esters thereof. Among the suitable reagents for this purpose are the carboxylic and sulfonic acids. These acids include many of those known to be susceptible to overbasing and especially many of those disclosed in a number of U.S. Pat. Nos. such as 2,616,904; 2,695,910; 3,312,618; 3,746,643; 3,764,533; and the aforementioned 3,629,109. These patents are incorporated by reference herein for their disclosure of suitable acidic oleophilic reagents.

The sulfonic acids suitable for use as component B include those represented by the formulas $R^1(SO_3H)_r$ and $(R^2)_xT(SO_3H)_y$. In these formulas, $R^1$ is an aliphatic or aliphatic-substituted cycloaliphatic hydrocarbon or essentially hydrocarbon radical free from acetylenic unsaturation and containing up to about 60 carbon atoms. When $R^1$ is aliphatic, it usually contains at least about 15–18 carbon atoms; when it is an aliphatic-substituted cycloaliphatic radical, the aliphatic substituents usually contain a total of at least about 12 carbon atoms. Examples of $R^1$ are alkyl, alkenyl and alkoxy-alkyl radicals, and aliphatic-substituted cycloaliphatic radicals wherein the aliphatic substituents are alkyl, alkenyl, alkoxy, alkoxyalkyl, carboxyalkyl and the like. Generally, the cycloaliphatic nucleus is derived from a cycloalkane or a cycloalkene such as cyclopentane, cyclohexane, cyclohexene or cyclopentene. Specific examples of $R^1$ are cetylcyclohexyl, laurylcyclohexyl, cetyloxyethyl, octadecenyl, and radicals derived from petroleum, saturated and unsaturated paraffin wax, and olefin polymers including polymerized monoolefins and diolefins containing about 1–8 carbon atoms per olefinic monomer unit. $R^1$ can also contain other substituents such as phenyl, cycloalkyl, hydroxy, mercapto, halo, nitro, amino, nitroso, lower alkoxy, lower alkylmercapto, carboxy, carbalkoxy, oxo or thio, or interrupting groups such as —NH—, —O— or —S—, as long as the essentially hydrocarbon character thereof is not destroyed.

$R^2$ is generally a hydrocarbon or essentially hydrocarbon radical free from acetylenic unsaturation and containing about 4–60 aliphatic carbon atoms, preferably an aliphatic hydrocarbon radical such as alkyl or alkenyl. It may also, however, contain substituents or interrupting groups such as those enumerated above provided the essentially hydrocarbon character thereof is retained. In general, the non-carbon atoms present in $R^1$ or $R^2$ do not account for more than 10% of the total weight thereof.

The radical T is a cyclic nucleus which may be derived from an aromatic hydrocarbon such a benzene, naphthalene, anthracene or biphenyl, or from a heterocyclic compound such as pyridine, indole or isoindole. Ordinarily, T is an aromatic hydrocarbon nucleus, especially a benzene or naphthalene nucleus.

The subscript x is at least 1 and is generally 1–3. The subscripts r and y have an average value of about 1–4 per molecule and are generally also 1.

Illustrative sulfonic acids useful as component B are mahogany sulfonic acids, petrolatum sulfonic acids, mono- and polywax-substituted naphthalene sulfonic acids, cetylchlorobenzene sulfonic acids, cetylphenol sulfonic acids, cetylpyhenol disulfide sulfonic acids, cetoxycapryl benzene sulfonic acids, dicetyl thianthrene sulfonic acids, di-lauryl beta-naphthol sulfonic acids, dicapryl nitronaphthalene sulfonic acids, paraffin wax sulfonic acids, unsaturated paraffin wax sulfonic acids, hydroxy-substituted paraffin wax sulfonic acids, tetraisobutylene sulfonic acids, tetra-amylene sulfonic acids, chloro-substituted paraffin wax sulfonic acids, nitroso-substituted paraffin wax sulfonic acids, petroleum naphthene sulfonic acids, cetylcyclopentyl sulfonic acids, lauryl cyclohexyl sulfonic acids, mono-and polywax-substituted cyclohexyl sulfonic acids, postdodecylbenzene sulfonic acids, "dimer alkylate" sulfonic acids, and the like. These sulfonic acids are well-known in the art and require no further discussion herein.

For the purpose of this invention, the equivalent weight of a sulfonic acid is the molecule weight thereof divided by the number of sulfonic acid groups present therein. Thus, for a monosulfonic acid the equivalent weight is equal to the molecular weight.

Carboxylic acids suitable for use as component B include aliphatic, cycloaliphatic and aromatic mono- and polybasic carboxylic acids free from acetylenic unsaturation, including naphthenic acids, alkyl- or alkenyl-substituted cyclopentanoic acids, alkyl- or alkenyl-substituted cyclohexanoic acids, and alkyl- or alkenyl-substituted aromatic carboxylic acids. The aliphatic acids generally contain at least 8 and preferably at least 12 carbon atoms. The cycloaliphatic and aliphatic carboxylic acids can be saturated or unsaturated. Specific examples include 2-ethylhexanoic acid, linolenic acid, propylene tetramer-substituted maleic acid, behenic acid, isostearic acid, pelargonic acid, capric acid, palmitoleic acid, linoleic acid, lauric acid, oleic acid, ricinoleic acid, undecylic acid, dioctylcyclopentanecarboxylic acid, myristic acid, dilauryldecahydronaphthalenecarboxylic acid, stearyl-octahydroindenecarboxylic acid, palmitic acid, acids formed by oxidation of petrolatum or of hydrocarbon waxes, and commercially available mixtures of two or more carboxylic acids such as tall oil acids, rosin acids, and the like. The equivalent weight of any such acid is its molecular weight divided by the number of carboxy groups present therein.

The pentavalent phosphorus acids useful as component B may be represented by the formula

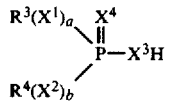

wherein each of $R^3$ and $R^4$ is hydrogen or a hydrocarbon or essentially hydrocarbon radical preferably having about 4–25 carbon atoms, at least one of $R^3$ and $R^4$ being hydrocarbon or essentially hydrocarbon; each of $X^1$, $X^2$, $X^3$ and $X^4$ is oxygen or sulfur; and each of a and b is 0 or 1. Thus it will be appreciated that the phosphorus acid may be an organophosphoric, phosphonic or phosphinic acid, or a thio analog of any of these. The equivalent weight of such a phosphorus acid is its molecular weight divided by the number of hydroxy groups bonded to phosphorus therein.

Usually, the phosphorus acids are those of the formula

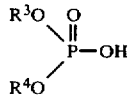

wherein $R^3$ is a phenyl radical of (preferably) an alkyl radical having up to 18 carbon atoms, and $R^4$ is hydrogen or a similar phenyl or alkyl radical. Mixtures of such phosphorus acids are often preferred because of their ease of preparation.

Also useful as component B are the alkali metal and alkaline earth metal salts (e.g., sodium, potassium, magnesium, calcium, strontium or barium salts, with magnesium salts being preferred) and esters of the acids previously described. The suitable esters include those with monohydric alcohols free from acetylenic unsaturation and having about 1–25 carbon atoms, incuding monohydric alcohols such as methanol, ethanol, the butanols, the hexanols, allyl alcohol, crotyl alcohol, stearyl alcohol and oleyl alcohol, and polyhydric alcohols such as ethylene glycol, diethylene glycol, propylene glycol, glycerol, sorbitol, sorbitan and similar carbohydrates and derivatives of carbohydrates. When an ester is used as component B, it is converted to the magnesium salt of the free acid during the reaction with component A and water. In other words, the acidic portion of the ester is the operative portion for the purpose of this invention and the identity of the alcoholic portion thereof is immaterial. Thus, it will be appreciated that the equivalent weight of the ester for the purpose of this invention is its molecular weight divided by the number of groups present therein which are convertible by hydrolysis to carboxylate or sulfonate groups or to pentavalent phosphorus acid groups under the reaction conditions of the invention. If any of the ester groups remain unconverted, the ester is considered as inert to that extent for the purpose of calculating its equivalent weight.

The preferred compounds for use as component B are the above-described sulfonic and carboxylic acids, especially those having an equivalent weight of about 300–500. The sulfonic acids are most often used, and a particular preference is expressed for alkylaromatic sulfonic acids and more particularly for alkylbenzenesulfonic acids.

It is also within the scope of the invention to use as component B mixtures of two or more of the abovedescribed compounds or types of compounds. Examples of suitable mixtures are mixtures of carboxylic acids, of sulfonic acids, and of sulfonic with carboxylic acids. Many such mixtures will be readily apparent to those skilled in the art. Particularly preferred are mixtures of alkylbenzenesulfonic acids with fatty acids (which may be hydrogenated) and with carboxylic acids formed by oxidation of hydrocarbons such [a] *as* petrolatum.

One of the characteristics of component B is that it is oleophilic. This means it is soluble or at least stably dispersible (as defined hereinafter) in oil or similar nonpolar organic liquids such as hexane, naphtha, Stoddard solvent, benzene, toluene and the like. While component B need not be oil-soluble, the oil-soluble sulfonic and carboxylic acids and phosphate esters are preferred for the purpose of this invention. These oil-soluble compounds constitute a known subgenus of the previously described compounds useful as component B.

COMPONENT C

Component C is water, which may be used in the liquid or vapor phase as described hereinafter. For the purpose of the present invention, the equivalent weight of water is considered to be 9 (half its molecular weight).

COMPONENT D

Component D is at least one organic solubilizing agent for component B. It may be solid or liquid at room temperature, although liquids are often preferred. It need not be a solvent for component B, in the sense that component B is entirely soluble therein when in the liquid state, but should be at least a partial solvent in the sense that relatively small proportions of component B, at least, when blended with component D in the liquid state will form a homogeneous mixture.

Materials useful as component D include substantially inert, normally liquid organic diluents. The term "substantially inert" as used herein is intended to mean that the diluent is inert to chemical or physical change under the conditions in which it is used so as not to materially interfere in an adverse manner with the preparation, storage, blending and/or functioning of the magnesium complex in the context of its intended use. For example, small amounts of a diluent can undergo minimal reaction or degradation without preventing the making and using of the invention as described herein. In other words, such reaction or degradation, while technically discernible, would not be sufficient to deter the practical worker of ordinary skill in the art from making and using the invention for its intended purposes. "Substantially inert" as used herein is thus readily understood and appreciated by those of ordinary skill in the art.

Among the preferred normally liquid diluents are non-polar compounds or mixtures of compounds such as naphtha, hexane, kerosene, mineral oil, Stoddard solvent, benzene, toluene, xylene, and alkylbenzenes of the type present as unsulfonated residue in alkylbenzenesulfonic acids. Also suitable are somewhat more polar liquids such as 1-butanol, 2-butanol, ethylene glycol, propylene glycol, ethylene glycol monomethyl ether, ethylene glycol monobutyl ether, ethylene glycol dimethyl ether, diethylene glycol and its ethers, wax-derived alcohol mixtures, methyl ethyl ketone, chlorobenzene, pyridine, indole, furan and tetrahydrofuran.

Also useful as materials which are chemically similar to the above-described liquids but solid at ambient temperature. These include the following, as well as mixtures of any two or more thereof:

Crystalline (including microcrystalline) and noncrystalline hydrocarbon waxes, including natural hydrocarbon waxes such as petrolatum, paraffin and olefin waxes, and synthetic hydrocarbon waxes such as polyethylene and other polyolefins.

Waxy alcohol mixtures such as $C_{20-40}$ aliphatic alcohols.

Resins such as styrene-butadiene copolymers, hydrogenated styrene-butadiene polymers, olefin-vinyl carboxylate (e.g., vinyl acetate) copolymers, and hydrocarbon resins.

It is also within the scope of the invention to use mixtures of any of the materials described above. Such mixtures may be of materials all of which are liquid at normal ambient temperatures (e.g., about 20°–30° C.), such as mineral oil-toluene, Stoddard solvent-toluene, mineral oil-alkylbenzene, Stoddard solvent-alkylbenzene; of materials all of which are solid at normal ambient temperatures, such as paraffin wax-polyethylene wax, paraffin wax-polyethylene wax-$C_{20-40}$ alcohol wax; or of materials which are both liquid and solid at normal ambient temperatures, such as mixtures of the above-mentioned normally liquid diluents and a resin or hydrocarbon wax (e.g., paraffin wax-toluene, polypropylene-toluene, polypropylene-mineral oil).

COMPONENT PROPORTIONS

The relative proportions of components A, B, C and D are an important feature of this invention since the physical state in which the magnesium complex is obtained depends to a great extent on the proportions of the components used for their preparation.

As previously noted, the ratio of equivalents of magnesium to the acid portion of component B (free carboxylic or sulfonic acid, or acidic phosphoric acid ester) is at least about 5:1. This ratio is hereinafter sometimes referred to as the "magnesium ratio". (It will be appreciated that the magnesium ratio is such as to produce a basic magnesium complex.) If component B is the free carboxylic acid, an ester thereof, a free sulfonic acid or an acidic phosphate ester, the ratio of component A to component B will be identical to the magnesium ratio. If component B is a magnesium salt of one of the above, the ratio of component A to component B will be somewhat less than the magnesium ratio since part of the magnesium is provided by component B.

It has been found that magnesium complexes with relatively low magnesium ratios (e.g., about 5-25:1 and particularly about 5-10:1) are particularly useful as lubricant additives. Complexes with a magnesium ratio above about 60:1 and preferably up to about 150:1 find utility principally as additives for fuel oils. As protective coatings for metals, it is preferred to employ complexes in which component D is entirely or predominantly liquid and the magnesium ratio is between about 25:1 and 60:1, or solid (e.g., "hot melt") complexes in which component D is entirely or predominantly solid at ambient temperature and which typically have a magnesium ratio of about 5-50:1.

The molar ratio of water (component C) to component A (hereinafter sometimes designated the "water ratio") is also critical. It should be at least sufficient to hyrate a substantial proportion of component A, calculated as magnesium oxide. If component A is magnesium hydroxide, it already contains at least this amount of water and the amount of additional water will depend on the nature of the product desired and the intended use thereof. On the other hand, if component A is anhydrous magnesium oxide the water ratio should generally be at least about 0.7:1 so as to produce the hydrated magnesium oxide referred to hereinabove.

Most often, a water ratio between about 0.7:1 and 3.0:1 is adequate to produce a composition of this invention. If larger amounts of water than this are used, it is frequently possible to remove excess water, at least some of which separates from the magnesium complex as a separate layer and the remainder of which can be removed by azeotropic distillation or the like. More water may be desirable for the preparation of the complex in certain instances; for example, magnesium oxide frequently contains traces of sodium compounds whose presence may be undesirable in the complex, and if so, such compounds may be removed by using up to about 8 moles of water per mole of component A and removing the excess, which has dissolved therein the sodium compounds. When the excess water has been removed, the molar ratio of remaining water to component A is usually below about 3:1 as noted above.

As among various magnesium complexes with water ratios between about 0.7:1 and 3.0:1, those having a water ratio below about 1:1 are often particularly useful as lubricant additives or fuel oil additives, while those having a somewhat higher water ratio (e.g., between about 1:1 and 3:1) may be particularly useful in the preparation of corrosion-resistant coating compositions.

The ratio of component D to component A is not critical and may be varied so as to provide magnesium complexes suitable for the particular use to which they are intended. For example, a complex suitable as a lubricant additive may frequently be obtained by employing as component D solely the unsulfonated alkylbenzene present as an impurity in the sulfonic acid used as component B. In that event, the weight ratio of component D to component A will usually be below about 1:1 and frequently as low as 0.5-0.7:1. In general, when a lubricant additive product is desired it is inadvisable to use volatile materials as component D.

When the magnesium complex is to be used as a fuel oil additive, higher amounts of component D are frequently preferred and these may include relatively volatile materials such as toluene or xylene, less volatile materials such as mineral oil or mineral seal oil, and mixtures of volatile and less volatile materials. The proportions of volatile and non-volatile solubilizing agents in such mixtures are subject to wide variation, but in any event it is usually found that the total weight ratio of component D to component A should be about 1.2-1.8:1.

When a product useful in a protective metal coating is desired, still higher ratios (e.g., about 2-3:1) are often employed with one of the solubilizing agents being a substantially volatile aliphatic hydrocarbon such as naphtha or Stoddard solvent, and the other being a somewhat less volatile material such as mineral oil. Another useful type of complex for metal coating is the solid (e.g., "hot melt") type briefly referred to hereinabove, in which component D comprises mostly or entirely materials which are solid at ambient temperature, in which case the ratio of D to A may be between about 0.5:1 and 6:1.

PREPARATION OF THE MAGNESIUM COMPLEX

The magnesium complexes of this invention are prepared by merely blending the components described hereinabove and heating the resulting blend at a temperature above about 30° C. It is important that water remain in the blend during substantially the entire period of preparation of the magnesium complex, and the maximum temperature thereof should be adjusted accordingly. However, said water may be present in the liquid or vapor state, i.e., as liquid water or as steam, though it will be apparent to those skilled in the art that the preparation of complexes involving a relatively large amount of water will be difficult if not impossible, at least at atmospheric pressure, if the water is present as steam. Therefore, it is generally found that temperatures of about 30°-125° C. are most conveniently employed at atmospheric pressure, and the preparation should be carried out under superatmospheric pressure if the use of higher temperatures is likely. Most often, a maximum temperature of about 100° C. is convenient when component D is entirely or predominantly liquid and the preferred temperature range is then about 40°-90° C. Naturally, the temperature may be somewhat higher (e.g., about 95°-150° C.) when component D is entirely or predominantly a solid at ambient temperature.

The order of addition of the various components is not critical. It is often convenient to first combine components A, B and D and subsequently to add component C (water) either all at once or incrementally. It is also often found convenient to prepare an initial mixture containing only a relatively small portion of component A (e.g., about 5-10% of the total amount thereof) and to add the remainder at a later stage, typically during or after the addition of water.

The magnesium complexes of this invention, when prepared as described herein, are often conveniently obtained as thickened compositions, i.e., viscous liquids or heterogeneous dispersions in the form of greases or gels, or (when component D is predominantly solid) as "hot melt" materials. For many purposes, such as the formation [corrosionresistant] *corrosion-resistant* coatings, it is preferred that they be used in such thickened or "hot melt" form. However, some other applications such as those involving lubricants and fuels may require that the complex be obtained in the form of a relatively non-viscous, easily flowable liquid. Such liquids may be obtained by methods well known to those of skill in the art, such as maximizing the amount of liquid diluent present as component D or by decreasing the relative amount of component A or component C in the reaction mixture. Alternatively, a thickened complex can be further diluted with a substantially inert organic liquid diluent of the type described hereinabove to produce a homogeneous solution. One of the unique and desirable characteristics of the compositions of this invention is their capability of existing either as heterogeneous thickened compositions or homogeneous, relatively dilute solutions or [dispersion] *dispersions.*

A method which is frequently advantageous for incorporating relatively large amounts of magnesium while making possible the formation of a homogeneous solution or dispersion in mineral oil or the like is to prepare the complex in the presence of ammonium hydroxide, which may be prepared from ammonia and the water present as component C. The amount of ammonium hydroxide required is small, generally less than about 10% by weight based on the water present. Insoluble materials can then be removed by diluting with a non-polar volatile organic liquid such as hexane or naphtha, centrifuging, and stripping the volatile liquid, or by equivalent means.

Another method for clarifying the magnesium complex for use in mineral oil, which may be employed in addition to or in place of preparation in the presence of ammonium hydroxide, is to add water or an acidic or basic reagent after preparation of the complex. The acidic or basic reagent may be organic or inorganic; suitable ones include sodium hydroxide, potassium hydroxide, ammonium hydroxide, triethanolamine, tartaric acid and citric acid. The amount of water or acidic or basic reagent is generally less than about 10% by weight of the magnesium complex system.

The molecular structures of the magnesium complexes of this invention are not known and are not a critical aspect of the invention. The magnesium complexes are, in general, most conveniently defined in terms of the method for their preparation.

The preparation of the magnesium complexes of this invention is illustrated by the following examples. All parts are by weight.

EXAMPLE 1

A blend is prepared of 135 parts of magnesium oxide and 600 parts of an alkylbenzenesulfonic acid having an equivalent weight of about 385, and containing about 24% unsulfonated alkylbenzene. During blending, an exothermic reaction takes place which causes the temperature to rise to 57° C. The mixture is stirred for one-half hour and then 50 parts of water is added. Upon heating at 95° C. for one hour, the desired magnesium oxide-sulfonate complex is obtained as a firm gel containing 9.07% magnesium.

EXAMPLE 2

A blend of 600 parts of the alkylbenzenesulfonic acid of Example 1 and 225 parts of magnesium oxide is prepared and heated for 2 hours at 60°-65° C. There is then added, over one hour, a solution of 10 parts of 30% ammonium hydroxide and 75 parts of water. The mixture is heated for 3 hours at 60°-65° C., and then an additional 10 parts of 30% ammonium hydroxide solution is added over 5 minutes. Upon heating for 2 more hours at 60°-65° C. and cooling, the desired magnesium oxide-sulfonate complex is obtained as a dark brown gel.

EXAMPLE 3

Following the procedure of Example 2, a blend is made of 600 parts of the alkylbenzenesulfonic acid of Example 1 and 225 parts of magnesium oxide, and a solution of 30 parts of 30% ammonium hydroxide in 75 parts of water is added. After heating for 4 hours at 60°-65° C., the mixture is cooled and 900 parts of hexane is added. The [hexanediluted] *hexane-diluted* mixture is centrifuged and the hexane is removed by vacuum stripping at 150° C. The residue is cooled to 130° C. and 18 parts of triethanolamine is added. The product is the desired magnesium oxide-sulfonate complex, a soft brown gel which contains 11.3% magnesium.

EXAMPLE 4

Magnesium hydroxide, 233 parts, is added to 600 parts of the alkylbenzenesulfonic acid of Example 1. There is then added 1250 parts of water and the mixture is heated gradually to about 80° C. over about 2 hours, whereupon a gel forms. The mixture is allowed to stand and a water layer of 830 parts is decanted; 570 parts of toluene is then added and an additional 300 parts of water is removed by azeotropic distillation.

A 602-part portion of the resulting gel is diluted with 200 parts of toluene. The solution is centrifuged and the toluene removed by blowing with nitrogen at 160°-170° C. to yield the desired magnesium oxide-sulfonate complex as a soft gel.

EXAMPLE 5

Magnesium oxide, 600 parts, is added to a solution in 478 parts of Stoddard solvent and 244 parts of mineral oil of 308 parts of an alkylbenzenesulfonic acid having an equivalent weight of about 430 and containing about 22% unsulfonated alkylbenzene. Water, 381 parts, is added and the mixture is heated under reflux for 15 minutes. It is then cooled to room temperature, yielding the desired magnesium oxide-sulfonate complex in the form of a gel.

EXAMPLE 6

A mixture of 204 parts of the alkylbenzenesulfonic acid of Example 1, 88 parts of mineral oil and 515 parts of Stoddard solvent is prepared, and 320 parts of magnesium oxide is added, followed by 420 parts of water. The mixture is heated at 95°-100° C., with stirring, until gelation occurs. The excess water (about 300 parts) is then removed by azeotropic distillation to yield the desired magnesium [oxidesulfonate] *oxide-sulfonate gel.*

EXAMPLE 7

A mixture is prepared of 1106 parts of water, 54 parts of magnesium oxide, 425 parts of the alkylbenzenesulfonic acid of Example 5, 495 parts of mineral oil and 856 parts of Stoddard solvent. An additional 781 parts of magnesium oxide is then added and the mixture is slowly heated to 52°-55° C. There was then added 30 parts of tetrapropenyl succinic acid and 37 parts of a black pigment. Upon screening and cooling, the desired composition containing the magnesium oxide-sulfonate gel is obtained.

EXAMPLE 8

A mixture of 125 parts of toluene, 225 parts of the alkylbenzenesulfonic acid of Example 5, 680 parts of mineral oil, 550 parts of magnesium oxide and 200 parts of water is heated slowly to reflux temperature (about 100° C.) and excess water (about 43 parts) is removed by azeotropic distillation. The residue is stripped under vacuum at 170° C. as 117 parts of volatiles are removed. The residue from the stripping is cooled to yield the desired magnesium [oxidesulfonate] *oxide-sulfonate* complex in the form of a gel.

EXAMPLE 9

A mixture of 2050 parts of water, 30 parts of magnesium oxide, 294 parts of the alkylbenzenesulfonic acid of Example 5, and 520 parts of oil is heated to 35°-40° C., and an additional 715 parts of magnesium oxide is added slowly. An exothermic reaction takes place and the magnesium oxide addition is regulated so as to cause a temperature increase of about 10° C. per hour to a maximum temperature of about 65° C. Heating is continued until the temperature reaches 85° C., whereupon a gel is obtained containing a clear water layer on top. The excess water (about 1552 parts) is decanted. To the residue are added 375 parts of mineral oil and 165 parts of toluene, and an additional portion of water (259 parts) is removed by azeotropic distillation. Excess toluene is removed by stripping under nitrogen (180° C.) and the residue is screened to yield the desired magnesium [oxidesulfonate] *oxide-sulfonate* gel.

EXAMPLE 10

A mixture of 900 parts of water, 333 parts of magnesium oxide, 266 parts of mineral oil and 132 parts of the alkylbenzenesulfonic acid of Example 1 is heated to 80°-85° C., with stirring, over about 45 minutes. It is maintained at this temperature for about 10-15 minutes after gelation takes place, after which time stirring is discontinued and a water layer of about 793 parts is decanted. There are added 135 parts of mineral oil and 75 parts of toluene, and an additional 43 parts of water is removed by azeotropic distillation. The toluene is stripped at 180° C. by nitrogen blowing and the residue is screened to yield the desired magnesium oxide-sulfonate complex as a thick opaque liquid.

EXAMPLE 11

An acidic phosphate ester is prepared by adding 136 parts of methanol and 744 parts of a commercial mixture of predominantly straight chain $C_{12-14}$ alcohols to a suspension of 284 parts of phosphorus pentoxide in 800 parts of hexane, with stirring. After the alcohols have been added, the reaction mixture is heated under reflux for 4 hours and hexane is removed by distillation. The resulting acidic phosphate ester has an equivalent weight of about 200.

A mixture of 200 parts of the resulting acidic phosphate ester, 310 parts of toluene, 880 parts of mineral oil and 440 parts of magnesium oxide is prepared and heated to 60° C., with stirring, over ½ hour. Water, 200 parts, is then added and the mixture is heated at 94° C. for 45 minutes, with continued stirring. Excess water is then removed by azeotropic distillation (a total of 90 parts) and the toluene is removed by vacuum stripping to yield the desired magnesium oxide-phosphate complex as a pourable gel.

EXAMPLE 12

A mixture of 754 parts of water, 23 parts of magnesium oxide, 210 parts of mineral oil and 247 parts of Stoddard solvent is heated to about 40° C. and 331 parts of a carboxylic acid having an equivalent weight of about 350 and obtained by oxidation of petrolatum, which acid has been preheated to about 50°-60° C., is added as the temperature of the mixture is maintained at 40°-45° C. An additional 350 parts of magnesium oxide is added, with stirring, and the temperature of the mixture is increased to 75° C. An opaque dispersion is obtained which is screened to afford the desired magnesium oxide-carboxylate complex.

EXAMPLE 13

A product similar to that of Example 12 is prepared, substituting about 300 parts of sorbitan trioleate for the oxidized petrolatum.

EXAMPLE 14

A reaction vessel is charged with 63 parts of "Epal 20+", a solid mixture consisting predominantly of $C_{20-32}$ linear and branched aliphatic alcohols and available from Ethyl Corporation; 83 parts of "Factowax R-143", a paraffin wax available from Standard Oil Company (Ohio) and melting at about 62° C.; and 83 parts of "Bareco Polywax 655", a polyethylene synthetic wax manufactured by Petrolite Corp. and melting at about 102° C. The mixture is melted and 21 parts of magnesium oxide is added. As the mixture is agitated at 96°-99° C., 235 parts of the alkylbenzenesulfonic acid of Example 5 is added. Following the sulfonic acid addition, an additional 185 parts of magnesium oxide is added at 96°-99° C. Mixing is continued at that temperature for 2 hours and then 69 parts of water is added over 2-½ hours at 99°-102° C. An additional 76 parts of alkylbenzenesulfonic acid is added at 96°-99° C. and mixing is continued for 1-½ hours after which the mixture is heated to 143°-149° C. for 3 hours and blown with nitrogen to remove volatiles by distillation. The residue is the desired solid magnesium oxide-sulfonate complex.

EXAMPLE 15

A mixture of 1280 parts of water, 18 parts of magnesium oxide, 180 parts of the alkylbenzenesulfonic acid of Example 5, and 215 parts of mineral seal oil is heated to 45° C. and an additional 534 parts of magnesium oxide is added, with stirring. The mixture is heated to 80°-85° C. over two hours whereupon partial coagulation takes place and a water layer separates. The water layer (about 1050 parts) is decanted and an additional 290 parts of mineral seal oil is added. The mixture is purged with nitrogen at 140°-145° C. for 2-½ hours to remove excess water and is then passed through a 20-mesh screen to yield the desired magnesium oxide-sulfonate complex.

EXAMPLE 16

A mixture of 16 parts of the alkylbenzenesulfonic acid of Example 5, 305 parts of mineral oil, 180 parts of magnesium oxide and 96 parts of "Hydrex 440", a mixture of hydrogenated fatty acids obtainable from Union Camp Corporation, is heated to 95° C. and blown with steam for two hours. The temperature is increased to 145°-150° C., an additional 28 parts of mineral oil is added and the mixture is blown with air as the temperature is heated to 170° C. over 15 minutes. The mixture is then cooled to room temperature and an additional 44 parts of mineral oil is added to yield the desired magnesium oxide-sulfonate complex having the consistency of a grease.

LUBRICANTS AND FUELS

When in the form of flowable liquids as previously described, the magnesium complexes of this invention are stably dispersible in the normally liquid media (e.g., oil, fuel, etc.) in which they are intended to function. Thus, for example, compositions intended for use in oils are stably dispersible in an oil in which they are to be used. The term "stably dispersible" as used in the specification and appended claims is intended to mean the magnesium complex or other material is capable of being dispersed in a given medium to an extent which allows it to function in its intended manner. Thus, for example, when a magnesium complex is used in an oil, it is sufficient that it be capable of being suspended in the oil in an amount sufficient to enable the oil to possess one or more of the desired properties imparted to it by the suspended complex. Such suspension can be achieved in various conventional ways. For example, in constantly circulating oil or oil in splash lubricating systems, physical agitation can keep the complex suspended in oil. Likewise, conventional dispersants (such as the acrylated nitrogen dispersants disclosed in U.S. Pat. No. 3,219,666) often found in lubricating oils and fuels promote the stable dispersion or suspension of the magnesium complex. In any event, the complex will be "stably dispersible" in the normally liquid media in which it will be used in at least the minimum concentrations set forth elsewhere herein. Thus, the terminology "stably dispersible" is used in a conventional manner and will be understood by those of ordinary skill in the art.

As previously indicated, the magnesium complexes of this invention may be homogeneously incorporated into lubricants, in which they function primarily as [ashproducing] *ash-producing* detergents. The products of Examples 1–4 are particularly useful for this purpose. They can be employed in a variety of lubricants based on diverse oils of lubricating viscosity, including natural and synthetic lubricating oils and mixtures thereof. These lubricants include crankcase lubricating oils for spark-ignited and compression-ignited internal combustion engines, including automobile and truck engines, two-cycle engines, aviation piston engines, marine and railroad diesel engines, and the like. They can also be used in gas engines, stationary power engines and turbines and the like. Automatic transmission fluids, transaxle lubricants, gear lubricants, metal-working lubricants, hydraulic fluids and other lubricating oil and grease compositions can also benefit from the incorporation therein of the magnesium complexes of the present invention.

Natural oils include animal oils and vegetable oils (e.g., castor oil, lard oil) as well as liquid petroleum oils and solvent-treated or acid-treated mineral lubricating oils of the paraffinic, naphthenic or mixed paraffinic-naphthenic types. Oils of lubricating viscosity derived from coal or shale are also useful base oils. Synthetic lubricating oils include hydrocarbon oils and halosubstituted hydrocarbon oils such as polymerized and interpolymerized olefins [e.g., polybutylenes, polypropylenes, propylene-isobutylene copolymers, chlorinated polybutylenes, poly(1-hexenes), poly(1-octenes), poly(1-decenes), etc. and mixtures thereof]; alkylbenzenes [e.g., dodecylbenzenes, tetradecylbenzenes, dinonylbenezenes, di-(2-ethylhexyl)-benzenes, etc.]; polyphenyls (e.g., biphenyls, terphenyls, alkylated polyphenyls, etc.), alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc. constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diphenyl ether of polyethylene glycol having a molecular weight of 500–1000, diethyl ether of polypropylene glycol having a molecular weight of 1000–1500, etc.) or mono- and polycarboxylic esters thereof, for example, the acetic acid esters, mixed $C_3$–$C_8$ fatty acid esters, or the $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid, and the like.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl) silicate, tetra-(4-methyl-2-ethylhexyl) silicate, tetra-(p-tert-butylphenyl) silicate, hexyl-(4-methyl-2-pentoxy)-disiloxane, poly(methyl)siloxanes, poly(methylphenyl)siloxanes, etc.). Other synthetic lubricating oils include liquid esters of phosphorus-containing acids (e.g., tricresyl phosphate, trioctyl phosphate, diethyl ester of decylphosphine acid, etc.), polymeric tetrahydrofurans and the like.

Unrefined, refined and rerefined oils (and mixtures of each with each other) of the type dislosed hereinabove can be used in the lubricant compositions of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques are known to those of skill in the art such as solvent extraction, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

Generally, the lubricants of the present invention contain an amount of the composition of this invention sufficient to impart detergency thereto. Normally this amount will be about 0.05–20.0%, preferably about 0.5–10.0%, of the total weight of the lubricant. In lubricating oils operated under extremely adverse conditions, such as lubricating oils for marine diesel engines, the magnesium complexes of this invention may be present in amounts up to about 30%.

The magnesium complexes of the present invention, as illustrated by the products of Examples 8–10 and 15, are also useful as corrosion inhibitors, vanadium scavengers and smoke suppressants in fuels. For that purpose, they are homogeneously incorporated in minor proportions in normally liquid fuels, usually hydrocarbonaceous fuels such as fuel oils, bunker fuels and the like. Normally liquid fuel compositions comprising non-hydrocarbonaceous materials such as alcohols, ethers, organo-nitro compounds and the like (e.g., methanol, ethanol), diethyl ether, methyl ethyl ether, nitromethane) are also within the scope of the invention as are liquid fuels derived from vegetable or mineral sources such as corn, alfalfa, shale and coal. Normally liquid fuels which are mixtures of one or more hydrocarbonaceous fuels and one or more non-hydrocarbonaceous materials are also contemplated.

Generally, these fuel compositions contain an amount of the magnesium complex sufficient to impart corrosion-resistance thereto, suppress smoke or serve as a vanadium scavenger; usually this amount is about 1–10,000, preferably 4–1000, parts thereof by weight per million parts of fuel.

The invention also contemplates the use of other additives in combination with the magnesium complexes. Other additives useful in lubricants include, for example, auxiliary detergents and dispersants of the ash-producing or ashless type, corrosion- and oxidation-inhibiting agents, pour point depressing agents, extreme pressure agents, color stabilizers and anti-foam agents.

The auxiliary ash-producing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature above 50° C. and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, cellosolve, carbitol, ethylene glycol, stearyl alcohol, and cyclohexyl alcohol; and amines such as aniline, phenylenediamine, phenothiazine, phenyl-$\beta$-naphthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60°–200° C.

Ashless detergents and dispersants are so called despite the fact that, depending on its constitution, the dispersant may upon combustion yield a non-volatile material such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen-containing compounds such as [amine] *amines*, organic hydroxy compounds such as phenols and alcohols, and/or basic inorganic materials. Examples of these "carboxylic dispersants" are described in British Pat. No. 1,306,529 and in many U.S. Pat. Nos. including the following:

| | | |
|---|---|---|
| 3,163,603 | 3,351,552 | 3,541,012 |
| 3,184,474 | 3,381,022 | 3,542,678 |
| 3,215,707 | 3,399,141 | 3,542,680 |
| 3,219,666 | 3,415,750 | 3,567,637 |
| 3,271,310 | 3,433,744 | 3,574,101 |
| 3,272,746 | 3,444,170 | 3,576,743 |
| 3,281,357 | 3,448,048 | 3,630,904 |
| 3,306,908 | 3,448,049 | 3,632,510 |
| 3,311,558 | 3,451,933 | 3,632,511 |
| 3,316,177 | 3,454,607 | 3,697,428 |
| 3,340,281 | 3,467,668 | 3,725,441 |
| 3,341,542 | 3,501,405 | Re 26,433 |
| 3,346,493 | 3,522,179 | |

(2) Reaction products of relatively high molecular weight aliphatic or alicyclic halides with amines, preferably polyalkylene polyamines. These may be characterized as "amine dispersants" and examples thereof are described for example, in the following U.S. Pat. Nos.:

| | |
|---|---|
| 3,275,554 | 3,454,555 |
| 3,438,757 | 3,565,804 |

(3) Reaction products of alkyl phenols in which the alkyl group contains at least about 30 carbon atoms with aldehydes (especially formaldehyde) and amines (especially polyalkylene polyamines), which may be characterized as "Mannich dispersants". The materials described in the following U.S. Pat. Nos. are illustrative.

| | |
|---|---|
| 3,413,347 | 3,725,480 |
| 3,697,574 | 3,726,882 |
| 3,725,277 | |

(4) Products obtained by post-treating the carboxylic, amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. Pat. Nos.:

| | | | |
|---|---|---|---|
| 3,036,003 | 3,282,955 | 3,493,520 | 3,639,242 |
| 3,097,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,397,574 |
| 3,256,185 | 3,403,102 | 3,573,010 | 3,702,757 |
| 3,278,550 | 3,442,808 | 3,579,450 | 3,703,536 |
| 3,250,234 | 3,455,831 | 3,591,598 | 3,704,308 |
| 3,281,428 | 3,455,832 | 3,600,372 | 3,708,522 |

(5) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-substituted acrylates. These may be characterized as "polymeric dispersants" and examples thereof are disclosed in the following U.S. Pat. Nos.:

| | |
|---|---|
| 3,329,658 | 3,666,730 |
| 3,449,250 | 3,687,849 |
| 3,519,565 | 3,702,300 |

The above-noted patents are incorporated by reference herein for their disclosures of ashless dispersants.

Extreme pressure agents and corrosion- and oxidation-inhibiting agents are exemplified by chlorinated aliphatic hydrocarbons such as chlorinated wax; organic sulfides and polysulfides such as benzyl disulfide, bis(chloro-benzyl)disulfide, dibutyl tetrasulfide, sulfurized methly ester of oleic acid, sulfurized alkylphenol, sulfurized dipentene, and sulfurized terpene; phosphosulfurized hydrocarbons such as the reaction product of a phosphorus sulfide with turpentine or methyl oleate; phosphorus esters including principally dihydrocarbon and trihydrocarbon phosphites such as dibutyl phosphite, diheptyl phosphite, dicyclohexyl phosphite, pentyl phenyl phosphite, dipentyl phenyl phosphite, tridecyl phosphite, distearyl phosphite, dimethyl napthyl phosphite, oleyl 4-pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyl dithiocarbamate; Group II metal phosphorodithioates such as zinc dicyclohexylphosphorodithioate, zinc dioctylphosphorodithioate, barium di(heptylphenyl)-phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

Other additives useful in fuels include deposit preventers or modifiers such as triaryl phosphates, dyes, cetane improvers, antioxidants such as 2,6-di-tertiarybutyl-4-methylphenol, rust inhibitors such as alkylated succinic acids and anhydrides, bacteriostatic agents, gum inhibitors, metal deactivators, demulsifiers and the like.

The magnesium complexes of this invention can be added directly to the lubricant of fuel. Preferably, however, they are diluted with a substantially inert, normally liquid organic diluent such as those mentioned hereinabove, particularly mineral oil, naphtha, benzene, toluene or xylene, to form an additive concentrate. These concentrates generally contain about 20–90% by weight of the magnesium complex and may contain in addition, one or more of the other additives described hereinabove.

The lubricants of this invention are illustrated by the following example. All parts are by weight.

EXAMPLE 17

| Ingredient | Parts |
|---|---|
| Mineral oil SAE 10W-40 base) | 86.83 |
| Product of Example 4 | 0.49 |
| Mixed ester-amide of polybutenyl succinic acid | 3.02 |
| Zinc dialkylphosphorodithioate | 0.82 |
| Sulfurized alkyl cyclohexenecarboxylate | 0.39 |
| Tetrapropenylsuccinic acid | 0.07 |
| Ethoxylated alkyl phenol | 0.29 |
| Hindered phenol antioxidant | 0.34 |
| Polyacrylate viscosity index improver | 7.75 |
| Silicone anti-foam agent | 0.01 |

CORROSION-RESISTANT COATINGS AND OTHER USES

The thickened magnesium complexes of this invention are useful as corrosion-resistant coatings for metal (e.g., ferrous metal, galvanized, aluminum or magnesium) surfaces, especially in the nature of undercoats for automotive bodies, coatings for structural members such as automotive frames, and the like. They may be employed as such alone, in combination with other basic metal sulfonates and the like known to be useful in corrosion-resistant coatings, and/or in combination with known adjuvants for such corrosion-resistant coatings such as acidic phosphate esters, resins, and waxes. Many of the suitable resins and waxes are the same as those described hereinabove with reference to component D; they may be incorporated in varying amounts in the thickened complex but generally comprise a minor amount of the coating composition. U.S. Pat. Nos. 3,453,124 and 3,671,072 are incorporated by reference herein for their disclosures of basic compositions and adjuvants useful in combinstion with the thickened magnesium complexes.

The products of Examples 5–7 are exemplary of the magnesium complexes suitable for use as corrosion-resistant coatings of the undercoat type. Also useful for this purpose is the product prepared by the following example.

EXAMPLE 18

A product is obtained substantially in accordance with the procedure of Example 7 by the reaction of 11.61 parts of the alkylbenzenesulfonic acid of Example 5, 9.2 parts of mineral oil, 23.71 parts of Stoddard solvent, 22.61 parts of magnesium oxide and 30.92 parts of water. To the resulting gel are added 0.97 part of a black pigment composition and 1.0 part of a vinyl acetate-ethylene copolymer comprising about 28% vinyl acetate units.

For coating automotive frames and the like, a solid "hot melt" composition of the type described in Example 14 is particularly suitable. Frequently, a dye or pigment is added to the "hot melt" composition; for example, 17 parts of a black pigment may be added to the product of Example 14 immediately after the distillation step and distillation may then be continued to remove volatiles present in the dye or pigment composition.

For corrosion-inhibiting purposes, the thickened or solid composition of this invention may be applied to the metal surface by any ordinary method such as brushing, spraying, dip-coating, flow-coating, roller-coating and the like, with heating if necessary (as to liquefy a solid composition). The viscosity of a thickened composition may be adjusted for the particular method of application selected by adding, if necessary, a substantially inert, normally liquid organic diluent such as those disclosed hereinabove. The coated metal surface may then be dried either by exposure to air or by baking, although drying frequently takes place without a separate drying step. If the coating composition is of a suitable viscosity to allow direct application to the metal surface, typically the consistency of a No. 1 or No. 2 grease, no solvent is used and no drying procedure need be followed. A more viscous grease can be diluted to produce a less viscous grease which is suitable for application as previously noted. The film thickness is not critical although a coating of about 50–2000 mg. per square foot of surface in the case of an undercoat, and up to about 10,000 mg. per square foot in the case of a coating for frames or other structural members, is usually sufficient to provide adequate protection. Heavier coatings can be used if desired, but they normally contribute little in the way of additional protection.

The magnesium complexes of this invention are also useful as lubricant greases and as stabilizers for resinous compositions, typically polyvinyl chloride, to protect them against oxidative degradation.

What is claimed is:

[1. A method for preparing a non-carbonated magnesium-containing complex which comprises heating, at a temperature above about 30° C., a mixture comprising:

(A) At least one of magnesium hydroxide, magnesium oxide, hydrated magnesium oxide, or a magnesium alkoxide;

(B) At least one oleophilic organic reagent comprising a carboxylic acid, a sulfonic acid, a pentavalent phosphorus acid, or an ester or alkali metal or alkaline earth metal salt of any of these;

(C) Water; and (D) At least one organic solubilizing agent for component B;

the ratio of equivalents of magnesium to component B, calculated as the free carboxylic or sulfonic acid or as the phosphoric acid ester, being at least about 5:1, and the amount of water present being at least sufficient to hydrate a substantial proportion of component A calculated as magnesium oxide.]

[2. A method according to claim 1 wherein component d is at least one substantially inert, normally liquid organic diluent.]

[3. A method according to claim 2 wherein component B is at least one sulfonic acid or salt thereof.]

[4. A method according to claim 3 wherein the molar ratio of component C to component A is at least about 0.7:1. ]

[5. A method according to claim 4 wherein component B is at least one alkylaromatic sulfonic acid.]

[6. A method according to claim 5 wherein component B is at least one alkylbenzenesulfonic acid.]

[7. A method according to claim 6 wherein component A is magnesium oxide.]

[8. A method according to claim 2 wherein component B is a mixture of at least one alkylbenzenesulfonic acid and at least one hydrogenated fatty acid or carboxylic acid formed by oxidation of petrolatum.]

[9. A method according to claim 8 wherein the mole ratio of component C to component A is at least about 0.7:1.]

[10. A method according to claim 9 wherein component A is magnesium oxide. ]

[11. A method according to claim 1 wherein component D is at least one substantially inert organic material which is solid at ambient temperature.]

[12. A method according to claim 11 wherein component B is at least one sulfonic acid or salt thereof.]

[13. A method according to claim 12 wherein the molar ratio of component C to component A is at least about 0.7:1.]

[14. A method according to claim 13 wherein component B is at least one alkylaromatic sulfonic acid.]

[15. A method according to claim 14 wherein component B is at least one alkylbenzenesulfonic acid.]

[16. A method according to claim 15 wherein component A is magnesium oxide.]

[17. A method according to claim 1 wherein component D is a mixture of at least one one substantially inert material which is solid at ambient temperature with at least one substantially inert, normally liquid organic diluent.]

[18. A method according to claim 17 wherein component B is at least one sulfonic acid or a magnesium salt thereof.]

[19. A method according to claim 18 wherein the molar ratio of component C to component A is at least about 0.7:1.]

[20. A method according to claim 19 wherein component B is at least one alkylaromatic sulfonic acid.]

[21. A method according to claim 20 wherein component B is at least one alkylbenzenesulfonic acid.]

[22. A method according to claim 21 wherein component A is magnesium oxide.]

[23. A method according to claim 17 wherein component B is a mixture of at least one alkylbenzenesulfonic acid and at least one carboxylic acid formed by oxidation of petrolatum.]

[24. A method according to claim 23 wherein the mole ratio of component C to component A is at least about 0.7:1.]

[25. A method according to claim 24 wherein component A is magnesium oxide.]

[26. A complex prepared by the method of claim 1.]

[27. A complex prepared by the method of claim 3.]

[28. A complex prepared by the method of claim 5.]

[29. A complex prepared by the method of claim 6.]

[30. A complex prepared by the method of claim 8.]

[31. A complex which is solid at ambient temperature, prepared by the method of claim 11.]

[32. A complex which is solid at ambient temperature, prepared by the method of claim 12.]

[33. A complex which is solid at ambient temperature, prepared by the method of claim 14.]

[34. A complex which is solid at ambient temperature, prepared by the method of claim 15.]

[35. A thickened complex according to claim 26.]

[36. A thickened complex according to claim 27.]

[37. A thickened complex according to claim 28.]

[38. A thickened complex according to claim 29.]

[39. A thickened complex according to claim 30.]

[40. A thickened complex prepared by the method of claim 17.]

[41. A thickened complex prepared by the method of claim 18.]

[42. A thickened complex prepared by the method of claim 20.]

[43. A thickened complex prepared by the method of claim 21.]

[44. A thickened complex prepared by the method of claim 23.]

[45. A complex of magnesium oxide or hydroxide and a magnesium sulfonate prepared by heating, at a temperature within the range of about 40°-90° C., a mixture comprising:

(A) Magnesium oxide;

(B) An alkylbenzenesulfonic acid having an equivalent weight within the range of about 300-500;

(C) Water; and (D) At least one of mineral oil, Stoddard solvent, toluene and the alkylbenzene whose sulfonation product is component B;

the ratio of equivalents of component A to component B being at least about 5:1 and the molar ratio of component C to component A being between about 0.7:1 and 3.0:1.]

[46. A thickened complex according to claim 45.]

[47. A complex of magnesium oxide or hydroxide and a magnesium sulfonate which is solid at ambient temperature and which is prepared by heating, at a temperature within the range of about 95°-150° C., a mixture comprising:

(A) Magnesium oxide;

(B) An alkylbenzenesulfonic acid having an equivalent weight within the range of about 300-500;

(C) Water; and (D) A mixture comprising hydrocarbon waxes, $C_{20-40}$ waxy aliphatic alcohols and the alkylbenzene whose sulfonation product is component B;

the ratio of equivalents of component A to component B being at least about 5:1 and the molar ratio of component C to component A being between about 0.7:1 and 3.0:1.]

48. An additive concentrate comprising a substantially inert, normally liquid organic diluent and about 20-90% by weight of [the complex of claim 26] *a complex according to any of claims 54-85.*

[49. An additive concentrate comprising a substantially inert, normally liquid organic diluent and about 20-90% by weight of the complex of claim 45.]

50. A composition comprising a major amount of a lubricating oil and a minor amount sufficient to impart detergency thereto of [the complex of claim 26] *a complex according to any of claims 54-85.*

[51. A composition comprising a major amount of a lubricating oil and a minor amount, sufficient to impart detergency thereto and comprising about 0.5-10.0% by weight, of the complex of claim 45.]

52. A composition comprising a major amount of a normally liquid fuel and a minor amount, sufficient to impart corrosion resistance thereto, suppress smoke or serve as a vanadium scavenger, of [the complex of claim 26] *a complex according to any of claims 54-85.*

[53. A composition comprising a major amount of a normally liquid fuel and a minor amount, sufficient to impart corrosion resistance thereto, suppress smoke or serve as a vanadium scavenger and comprising about 4-1000 parts by weight per million parts of fuel, of the complex of claim 45.]

*54. A non-carbonated magnesium-containing complex in the form of a solid, grease or gel, prepared by heating, at a temperature above about 30° C. and up to about 150° C. a mixture consisting essentially of*

*(A) at least one of magnesium hydroxide, magnesium oxide, hydrated magnesium oxide, or magnesium alkoxide;*

*(B) at least one oleophilic organic reagent consisting essentially of sulfonic acid, a pentavalent phosphorus acid, or an ester or alkali metal or alkaline earth metal salt of any of these;*

*(C) water; and*

*(D) at least one organic solubilizing agent for component B: the ratio of equivalents of magnesium to component B, calculated as the free sulfonic acid or as the phosphoric acid ester, being at least about 5:1; the amount of water present being at least sufficient to hydrate a substantial proportion of component A calculated as magnesium oxide and the weight ratio of solubilizing agent D to component A being at least 0.5:1.*

*55. A complex according to claim 54 wherein component D is at least one substantially inert, normally liquid organic diluent.*

*56. A complex according to claim 55 wherein component B is at least one sulfonic acid or salt thereof.*

*57. A complex according to claim 56 wherein the molar ratio of component C to component A is at least about 0.7:1.*

*58. A complex according to claim 57 wherein component B is at least one alkylaromatic sulfonic acid.*

*59. A complex according to claim 58 wherein component B is at least one alkylbenzenesulfonic acid.*

*60. A complex according to claim 59 wherein component A is magnesium oxide.*

*61. A solid complex according to claim 54 wherein component D is at least one substantially inert organic material which is solid at ambient temperature.*

*62. A solid complex according to claim 61 wherein component B is at least one sulfonic acid or salt thereof.*

*63. A solid complex according to claim 62 wherein the molar ratio of component C to component A is at least about 0.7:1.*

*64. A solid complex according to claim 63 wherein component B is at least one alkylaromatic sulfonic acid.*

*65. A solid complex according to claim 64 wherein component B is at least one alkylbenzenesulfonic acid.*

*66. A solid complex according to claim 65 wherein component A is magnesium oxide.*

*67. A complex according to claim 54 wherein component D is a mixture of at least one substantially inert material which is solid at ambient temperature with at least one substantially inert, normally liquid organic diluent.*

*68. A complex according to claim 67 wherein component B is at least one sulfonic acid or a magnesium salt thereof.*

*69. A complex according to claim 68 wherein the molar ratio of component C to component A is at least about 0.7:1.*

*70. A complex according to claim 69 wherein component B is at least one alkylaromatic sulfonic acid.*

*71. A complex according to claim 70 wherein component B is at least one alkylbenzenesulfonic acid.*

*72. A complex according to claim 71 wherein component A is magnesium oxide.*

*73. A complex of magnesium oxide or hydroxide and a magnesium sulfonate in the form of a solid, grease or gel, prepared by heating, at a temperature within the range of about 40°–90° C. consisting essentially of:*

*(A) magnesium oxide;*

*(B) an alkylbenzenesulfonic acid having an equivalent weight within the range of about 300–500;*

*(C) water; and*

*(D) at least one of mineral oil, Stoddard solvent, toluene or alkylbenzene whose sulfonation product is component B;*

*the ratio of equivalents of component A to component B being at least about 5:1; the molar ratio of component C to component A being between about 0.7:1 and 3.0:1 and the weight ratio of component D to component B being at least 0.5:1.*

*74. A complex of magnesium oxide or hydroxide and a magnesium sulfonate which is solid at ambient temperature and which is prepared by heating, at a temperature within the range of about 95°–150° C., a mixture comprising:*

*(A) magnesium oxide;*

*(B) an alkylbenzenesulfonic acid having an equivalent weight within the range of about 300–500;*

*(C) water; and*

*(D) a mixture comprising hydrocarbon waxes, $C_{20-40}$ waxy aliphatic alcohols and alkylbenzene whose sulfonation product is component B;*

*the ratio of equivalents of component A to component B being at least about 5:1 and the molar ratio of component C to component A being between about 0.7:1 and 3.0:1.*

*75. A non-carbonated magnesium-containing complex in the form of a solid prepared by heating, at a temperature above about 30° C., a mixture comprising:*

*(A) at least one of magnesium hydroxide, magnesium oxide, hydrated magnesium oxide, and a magnesium alkoxide;*

*(B) an oleophilic organic reagent comprising a mixture of a carboxylic acid containing at least 8 carbon atoms with a sulfonic acid, or esters or alkali metal or alkaline earth metal salts of any of these;*

*(C) water; and*

*(D) at least one organic solubilizing agent for component B, said agent being at least one substantially inert organic material which is solid at ambient temperature;*

*the ratio of equivalents of magnesium to component B, calculated as the free carboxylic or sulfonic acid being at least about 5:1, and the amount of water present being at least sufficient to hydrate a substantial proportion of component A calculated as magnesium oxide.*

*76. A complex according to claim 75 wherein component B is a mixture of at least one alkylbenzenesulfonic acid and at least one hydrogenated fatty acid or carboxylic acid formed by oxidation of petrolatum.*

*77. A complex according to claim 76 wherein the mole ratio of component C to component A is at least about 0.7:1.*

*78. A complex according to claim 77 wherein component A is magnesium oxide.*

*79. A solid complex according to claim 75 wherein component B is a mixture of at least one alkylbenzenesulfonic acid and at least one hydrogenated fatty acid or carboxylic acid formed by oxidation of petrolatum.*

*80. A solid complex according to claim 79 wherein the mole ratio of component C to component A is at least about 0.8:1.*

*81. A solid complex according to claim 80 wherein component A is magnesium oxide.*

*82. A complex according to claim 75 wherein component D is a mixture of at least one substantially inert material which is solid at ambient temperature with at least one substantially inert, normally liquid organic diluent.*

*83. A complex according to claim 82 wherein component B is a mixture of at least one alkylbenzenesulfonic acid and at least one carboxylic acid formed by oxidation of petrolatum.*

*84. A complex according to claim 83 wherein the mole ratio of component C to component A is at least about 0.7:1.*

*85. A complex according to claim 84 wherein component A is magnesium oxide.*

* * * * *

UNITED STATES PATENT AND TRADEMARK OFFICE

CERTIFICATE OF CORRECTION

PATENT NO. : Re. 32, 235

DATED : August 26, 1986

INVENTOR(S) : John W. Forsberg

It is certified that error appears in the above-identified patent and that said Letters Patent is hereby corrected as shown below:

Title page, Item [75]:

The inventor's name is shown as "John H. Forsberg" and should be -- John W. Forsberg --.

Signed and Sealed this

Sixteenth Day of December, 1986

*Attest:*

DONALD J. QUIGG

*Attesting Officer*

*Commissioner of Patents and Trademarks*